United States Patent
Nishimura et al.

(10) Patent No.: US 7,319,652 B2
(45) Date of Patent: *Jan. 15, 2008

(54) CONTROLLING OPTICAL PICKUP OF OPTICAL DISK DRIVE BY DETECTING CHANGE OF SAMPLING SIGNALS TAKEN FROM A MOTOR DRIVE SIGNAL

(75) Inventors: Hajime Nishimura, Hitachinaka (JP); Yoshihiro Fukagawa, Yokohama (JP); Seiji Inaba, Hitachinaka (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/106,451

(22) Filed: Apr. 15, 2005

(65) Prior Publication Data

US 2005/0180273 A1    Aug. 18, 2005

Related U.S. Application Data

(63) Continuation of application No. 10/112,047, filed on Apr. 1, 2002, now Pat. No. 6,954,414.

(30) Foreign Application Priority Data

Feb. 14, 2002    (JP) ............... 2002-37013

(51) Int. Cl.
*G11B 9/00*    (2006.01)
(52) U.S. Cl. ............... 369/53.35; 388/811; 318/254; 318/439
(58) Field of Classification Search .......... 369/53.35; 388/811; 318/254, 439
See application file for complete search history.

(56) References Cited

U.S. PATENT DOCUMENTS

| 4,283,783 | A | * | 8/1981 | Nakajima et al. ............. 368/76 |
| 4,288,731 | A |   | 9/1981 | Lee |
| 4,528,486 | A |   | 7/1985 | Flaig et al. |
| 4,647,990 | A | * | 3/1987 | Sasamura ..................... 360/70 |
| 4,843,496 | A | * | 6/1989 | Marchetti ................ 360/77.06 |
| 4,961,118 | A | * | 10/1990 | Ueda et al. ................. 358/497 |
| 4,965,504 | A | * | 10/1990 | Ueda et al. ................. 318/802 |

(Continued)

FOREIGN PATENT DOCUMENTS

JP    5-182208    7/1993

(Continued)

OTHER PUBLICATIONS

Japanese Office Action issued in Japanese Patent Application No. JP 2002-037013, dated Feb. 20, 2007.

*Primary Examiner*—Gautam R. Patel
(74) *Attorney, Agent, or Firm*—McDermott Will & Emery LLP

(57) ABSTRACT

A drive current or a drive voltage is controlled corresponding to change of load by sampling the drive current or drive voltage of a motor to move an optical pickup and then detecting change of the sampling signal as change of the optical pickup when it is moved. Moreover, change of the sampling signal is obtained from a difference of the sampling signals by comparing these sampling signals at the first and second points. Comparison of these sampling signals is conducted in unit of drive pulse.

15 Claims, 11 Drawing Sheets

U.S. PATENT DOCUMENTS

| | | | |
|---|---|---|---|
| 5,075,805 A | 12/1991 | Peddle et al. | |
| 5,084,661 A * | 1/1992 | Tanaka | 318/685 |
| 5,166,590 A * | 11/1992 | Tu et al. | 318/685 |
| 5,210,726 A | 5/1993 | Jackson et al. | |
| 5,212,434 A * | 5/1993 | Hsieh | 318/603 |
| 5,214,544 A * | 5/1993 | Kim | 360/75 |
| 5,227,931 A * | 7/1993 | Misumi | 360/78.13 |
| 5,264,769 A * | 11/1993 | Itoh | 318/685 |
| 5,309,079 A | 5/1994 | Takada | |
| 5,818,651 A * | 10/1998 | Nomura | 360/78.06 |
| 5,831,787 A | 11/1998 | Yoshida et al. | |
| 5,844,743 A * | 12/1998 | Funches | 360/78.04 |
| 5,963,005 A | 10/1999 | Yamaji | |
| 6,222,340 B1 * | 4/2001 | Kawabata et al. | 318/685 |
| 6,249,495 B1 * | 6/2001 | Okada et al. | 369/44.28 |
| 6,326,756 B1 * | 12/2001 | Youn | 318/569 |
| 6,341,103 B1 * | 1/2002 | Takeda et al. | 369/30.15 |
| 6,555,985 B1 * | 4/2003 | Kawabata et al. | 318/685 |
| 6,600,618 B2 | 7/2003 | Schlager | |
| 6,897,591 B2 * | 5/2005 | Peachee et al. | 310/166 |

FOREIGN PATENT DOCUMENTS

| | | |
|---|---|---|
| JP | 8-87843 | 4/1996 |
| JP | 11-306701 | 11/1999 |
| JP | 2000-011394 | 1/2000 |
| JP | 2002-10689 | 1/2002 |

* cited by examiner

CONTROLLING OPTICAL PICKUP OF OPTICAL DISK DRIVE BY DETECTING CHANGE OF SAMPLING SIGNALS TAKEN FROM A MOTOR DRIVE SIGNAL

RELATED APPLICATION

This application is a continuation of U.S. patent application Ser. No. 10/112,047, filed on Apr. 1, 2002 now U.S. Pat. No. 6,954,414.

BACKGROUND OF THE INVENTION

1. Technical Field of the Invention

The present invention relates to a technique for recording or reproducing information to an optical disk used as a storage medium.

2. Description of the Related Art

In recent years, variety of optical disk drives are developed in addition to a CD format for only reproduction in the field of the optical disk drive, for example, the disk drives for write-once type CD-R, CD-RW which allows repeated recording and reproducing operations, DVD-ROM which realizes high density reproducing operation of about seven times the density of CD, write-once type DVD-R and moreover DVD-RAM which allows repeated recording and reproducing operations, or the like. In these optical disk drives, information is recorded and reproduced by irradiating the information recording surface of an optical disk with an optical spot of laser beam and the positioning of optical spot for each track in the radius direction of optical disk is conducted through the control for position of objective lens with an actuator (hereinafter, referred to as tracking control) and the control for feed position of pickup on which the actuator is mounted (hereinafter, referred to as feed control). As the track width is narrowed with transfer of disk to DVD from CD, higher accuracy is required as the positioning accuracy between the optical axis of objective lens of actuator and the optical axis of laser mounted on the pickup. In the case of CD, such accuracy required is ±0.6 mm, while in the case of DVD-ROM, the required accuracy is ±0.3 mm.

In the case of DVD-RAM for recording information by generating a phase change on the disk surface utilizing generation of heat with a laser beam spot in order to conduct information recording on the optical disk, amount of optical beam must be acquired under the condition that the laser beam spot conforming to the Gaussian distribution is positioned with severe accuracy and the positioning accuracy between the optical axis of the objective lens of the actuator and the optical axis of the laser of optical pickup must be controlled within the range of ±0.1 mm. In view of realizing such positioning accuracy, as an optical pickup feed mechanism, the mechanism in which a screw is rotated with a stepping motor which can freely select by itself the rotating steps from a minute step to a large step is introduced and thereby the positioning control of the optical pickup can be realized.

The characteristics required for the optical pickup utilizing a stepping motor are that the optical pickup can be moved quickly without any problem at the time of random access and positioning can be realized accurately after the movement. In the case of DVD-ROM, the characteristics that the random access time is almost 90 ms and positioning accuracy between the optical axis of the objective lens of actuator and the optical axis of laser of optical pickup is ±0.3 mm have been realized. In the case of DVD-RAM, the characteristics that the positioning accuracy corresponding to ±0.1 mm is obtained, rotation step of the stepping motor is increased and quick movement of the optical pickup is realized by increasing a drive current have been attained by dividing the pitch of the screw mounted to the stepping motor.

When a stepping motor is used to move the optical pickup in an optical disk drive, a value attained by adding a sufficient margin load to the maximum load value which is assumed when the optical pickup is moved can be estimated as the total load to be driven with the motor and a drive torque of such stepping motor has been set as a value corresponding to such value. A slide resistance generated against a shaft to support the optical pickup and a slide resistance generated between the stepping motor and components to be engaged with the optical pickup can be considered as a moving load of the optical pickup observed from the stepping motor side and these slide resistances are changed depending on the gravity working on the optical pickup, aging deterioration of each component and ambient environment such as peripheral temperature and humidity.

With recent wide spreading of a notebook-size personal computer, an optical disk drive to be loaded into such small size personal computer is requested to realize further reduction in thickness and power consumption, while a stepping motor to move the optical pickup is also requested to realize also resulting reduction in thickness and power consumption based on the precondition that variation of the optical pickup moving load can be surely covered. The technique regarding reduction of power consumption of the stepping motor is described, for example, in the Japanese Unexamined Patent Publication No. 306701/1999, but this technique also includes a problem that a detecting means or the like provides possibility for increase of manufacturing cost of the drive. As the technique for controlling a current of a stepping motor depending on variation of the moving load of the optical pickup in which the influence by change of temperature environment and aging deterioration of components is considered, this publication describes the technique that a synchronism of the stepping motor is detected by comparing the number of pulses to drive the stepping motor with the number of tracks crossed on the optical disk and a drive current of the stepping motor is compensated for recovery from a synchronism.

Considering the background explained above, an object of the present invention is that power consumption can be lowered under the construction that increase of manufacturing cost of an optical disk drive is controlled and the predetermined movement of an optical pickup can be assured by covering variation of load such as a slide resistance of the optical pickup with change of a drive torque.

SUMMARY OF THE INVENTION

The present invention relates to an optical disk drive and a method of controlling movement of an optical pickup which have solved the problems explained above.

That is, the present invention basically samples a drive current or a drive voltage of a motor to move an optical pickup and detects change of the sampling signal as a change of a load when the optical pickup moves in order to control the drive current or drive voltage corresponding to variation of load. Moreover, change of the sampling signal is obtained from a difference among the sampling signals by comparing the sampling signal at the first timing with the sampling signal at the second timing. Moreover, comparison of such sampling signals is conducted in unit of the drive pulse.

In more practical, (1) the optical disk drive of the present invention is constructed to comprise a sampling circuit to form a sampling signal by sampling a drive current or a drive voltage of a motor to move an optical pickup almost in the radius direction of an optical disk and a control circuit for controlling the drive current or drive voltage based on a result of detection by detecting change of the sampling signal, whereby the movement of the optical pickup is controlled by controlling the motor depending on a change information of the sampling signal; (2) the optical disk drive of the present invention is also constructed to comprise a control circuit for forming a sampling signal in unit of stepping pulse by sampling the stepping pulse to drive a stepping motor to move an optical pickup almost in the radius direction of an optical disk and comparing the sampling signals to control a motor drive circuit depending on the result of comparison of sampling signals, whereby change of stepping pulse is detected based on the comparison of sampling signals and the stepping motor is controlled corresponding to a load of the optical pickup feed mechanism; (3) the optical disk drive of the present invention is also constructed to comprise a first control circuit for forming a sampling signal in unit of stepping pulse by sampling a stepping pulse to drive a stepping motor to move an optical pickup almost in the radius direction of an optical disk and storing the sampling signals to compare these sampling signals and a second control circuit for controlling the stepping pulses by controlling the motor drive circuit based on the comparison result, whereby change of stepping pulse is detected based on the comparison of sampling signals and the stepping motor is controlled corresponding to a load of the feed mechanism; (4) the optical disk drive of the present invention is also constructed to comprise a sampling circuit for forming a sampling signal in unit of stepping pulse by sampling a stepping pulse to drive a stepping motor to move an optical pickup almost in the radius direction of an optical disk, a storage circuit or storage medium for storing the sampling signals, a first control circuit for comparing the sampling signals and a second control circuit for controlling the motor drive circuit based on the result of comparison, whereby change of the stepping pulse is detected based on comparison of sampling signals and the stepping motor is controlled depending on a load of the feed mechanism of the optical pickup; (5) the optical disk drive of the present invention is constructed as explained in the item (1), whereby the sampling circuit forms a digital-converted sampling signal; (6) the optical disk drive of the present invention is constructed as explained in the item (3), whereby the first control circuit is constructed to store the digital-converted sampling signal; (7) the optical disk drive of the present invention is constructed as explained in the item (2), whereby the control circuit is constructed to detect change of the sampling signal by comparing the sampling signals between the adjacent stepping pulses; (8) the optical disk drive of the present invention is constructed as explained in the item (3), whereby the first control circuit is constructed to detect change of the sampling signal by comparing the sampling signals between the adjacent stepping pulses; (9) the optical disk drive of the present invention is constructed as explained in the item (2), whereby the control circuit is constructed to conduct any one of the compensation for level of the stepping pulse and compensation for the number of stepping pulses or both compensation processes. Moreover, (10) the method of moving and controlling an optical pickup of the optical disk drive of the present invention comprises a step for forming a sampling signal by sampling a drive current or a drive voltage of a motor to move an optical pickup almost in the radius direction of an optical disk, a step for detecting change of the sampling signals and a step for controlling a drive current or a drive voltage of a motor based on the result of detection, whereby the motor is controlled corresponding to a load when the optical pickup is moved in order to control the movement of the optical pickup; (11) the method of moving and controlling an optical pickup of the optical disk drive of the present invention comprises a step for forming a sampling signal in unit of drive pulse by sampling a drive pulse of a stepping motor to move an optical pickup almost in the radius direction of an optical disk, a step for comparing sampling signals and a step for detecting change of drive pulse based on the result of comparison, whereby the stepping motor is controlled corresponding to a load when the optical pickup is moved to control the movement of the optical pickup; (12) the method of moving and controlling an optical pickup of the optical disk drive of the present invention comprises a step for forming a sampling signal in unit of drive pulse by sampling a drive pulse of a stepping motor to move an optical pickup almost in the radius direction of an optical disk, a step for storing the sampling signals and comparing the sampling signals and a step for controlling the drive pulses by detecting change of the drive pulse based on the result of comparison, whereby the stepping motor is controlled corresponding to a load when the optical pickup is moved in order to control the movement of the optical pickup.

As explained above, according to the construction of the optical disk drive in which increase of manufacturing cost thereof is controlled, power consumption can be reduced, change of load when the optical pickup is moved such as a slide resistance thereof can be covered with change of a drive torque and thereby the predetermined movement of the optical pickup can be assured.

DETAILED DESCRIPTION OF THE REFERRED EMBODIMENTS

The preferred embodiments of the present invention will be explained with reference to the accompanying drawings.

Figure 1:
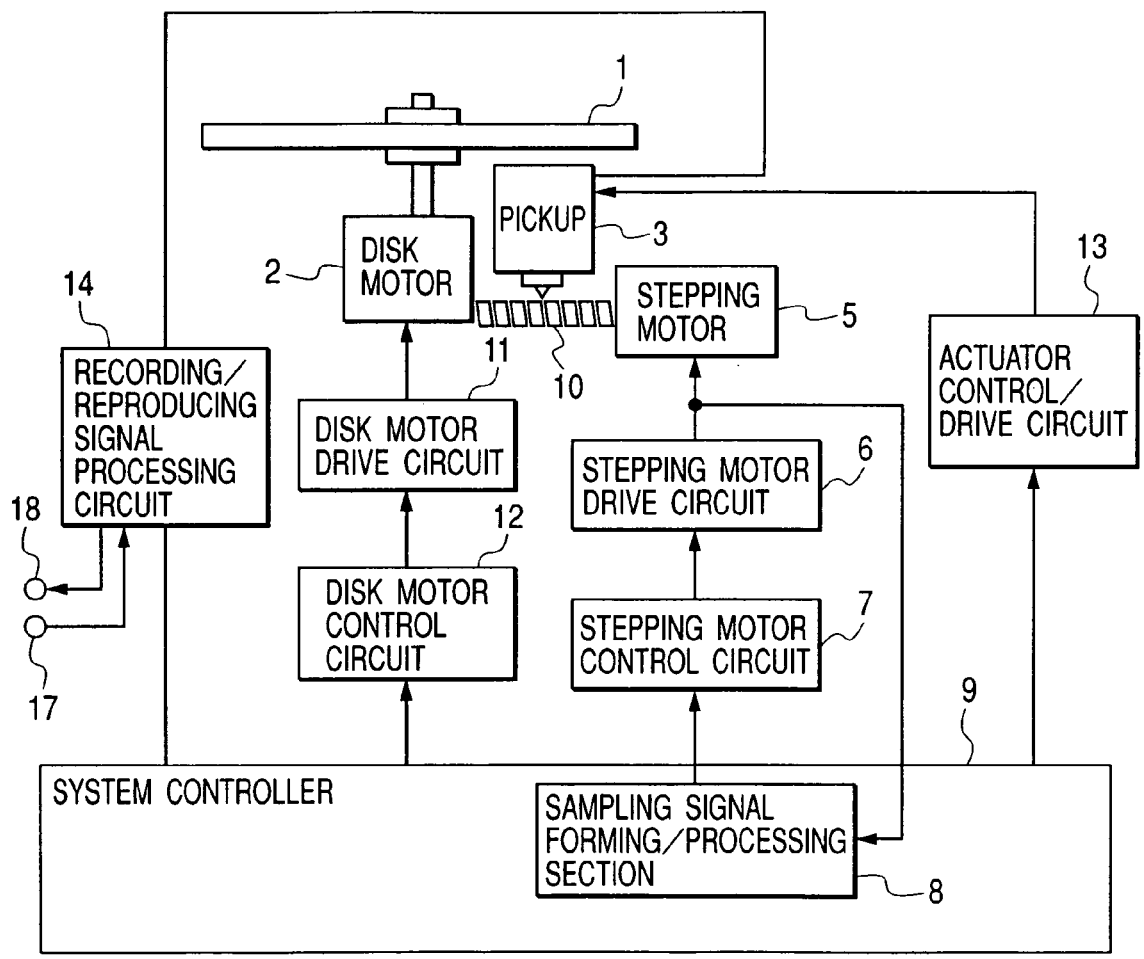
FIG. 1 shows an example of construction of an optical disk drive as an embodiment of the present invention.
Figure 2:
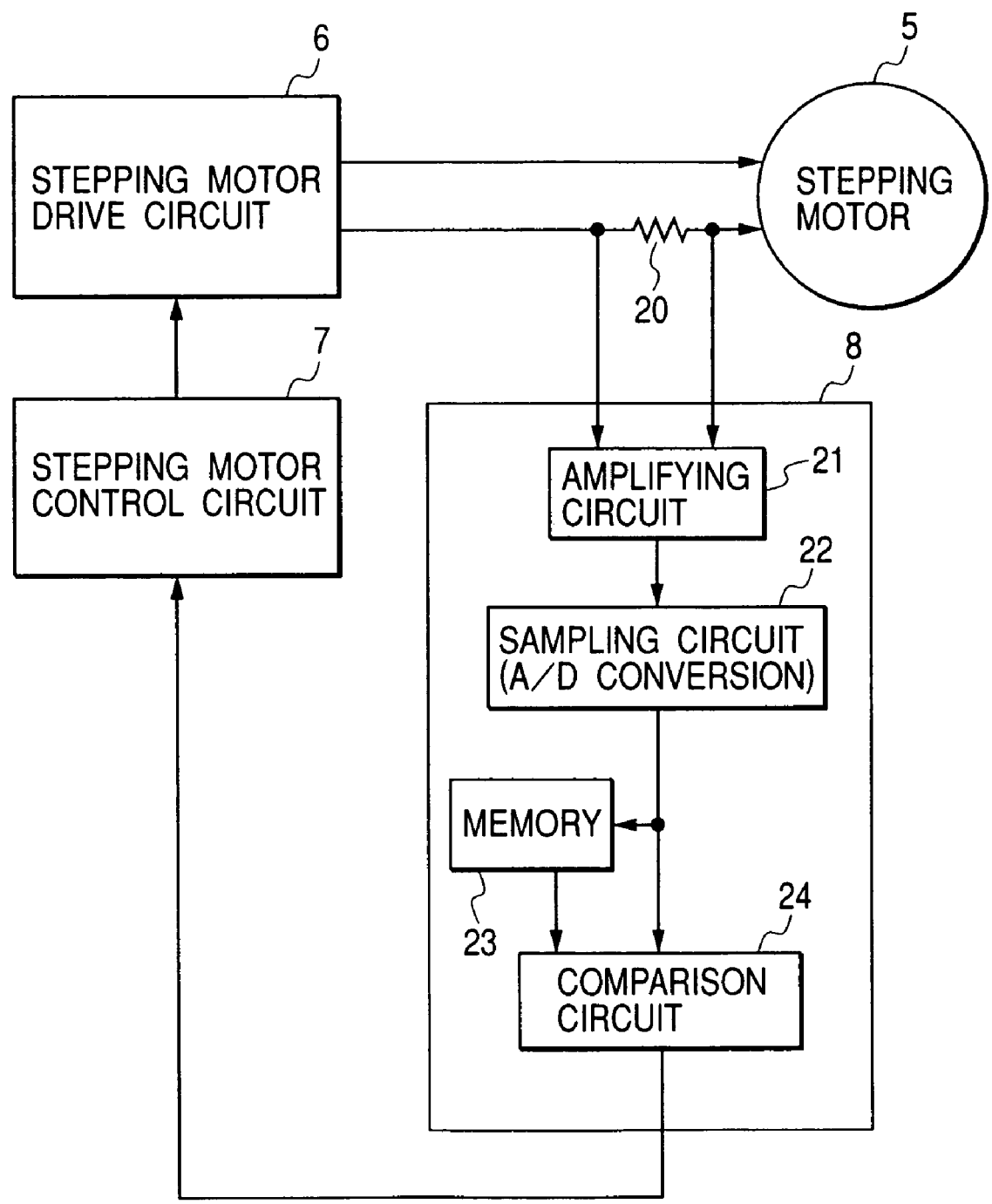
FIG. 2 shows an example of construction of a stepping motor control system of the optical disk drive of FIG. 1.
Figure 3:
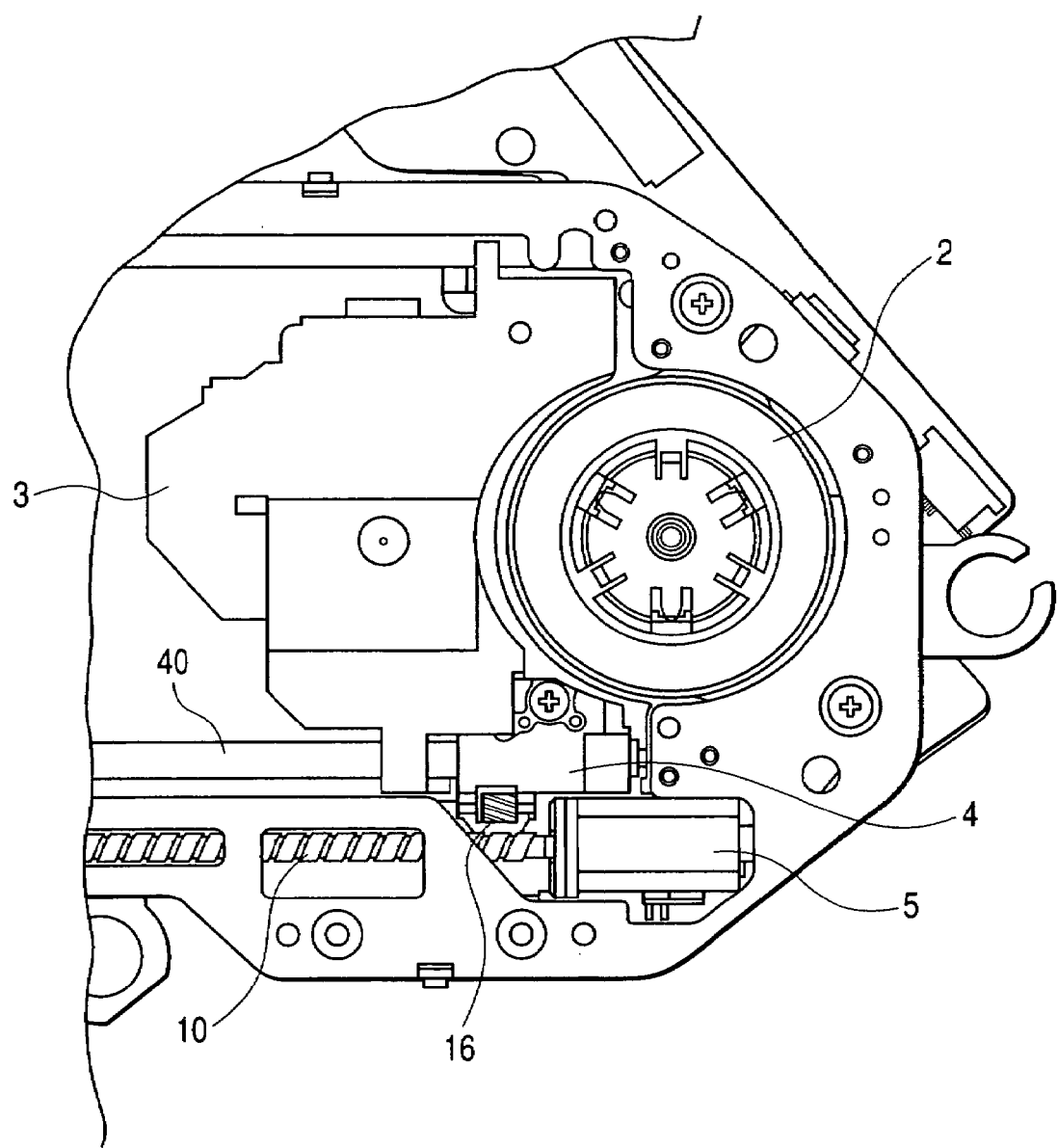
FIG. 3 shows an example of construction of an optical pickup feed mechanism of the optical disk drive of FIG. 1.
Figure 4:
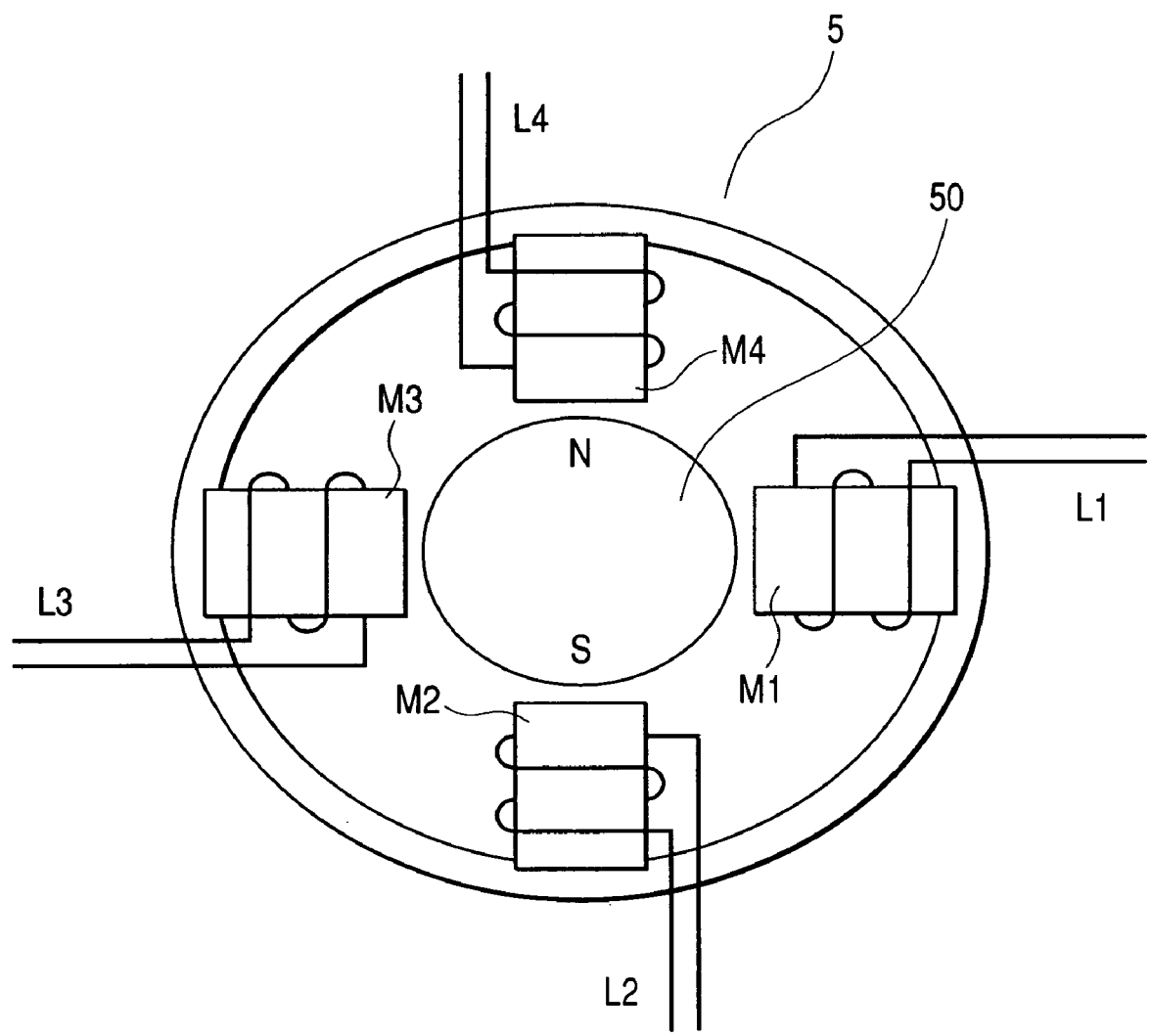
FIG. 4 is an explanatory diagram of operation principle of the stepping motor.
Figure 5:
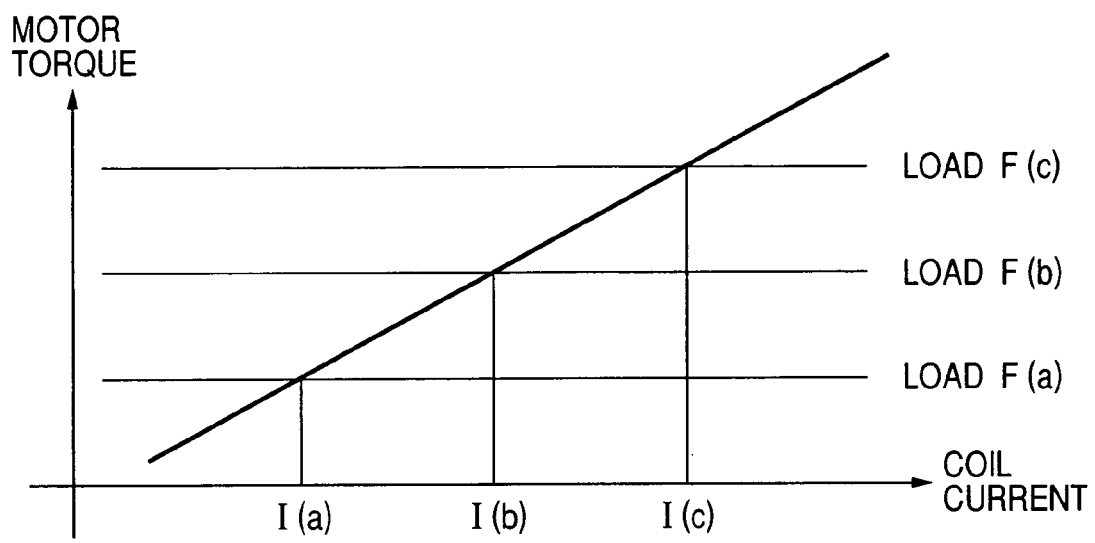
FIG. 5 shows an example of characteristic of the stepping motor.
Figure 10:
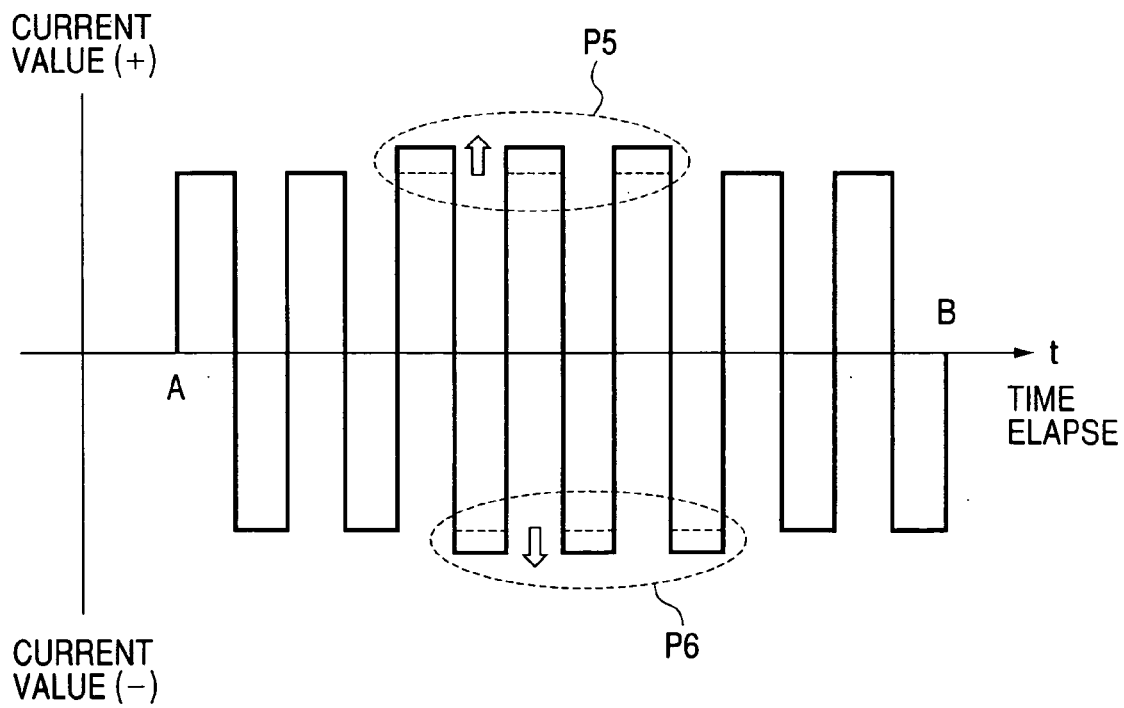
FIG. 10 is an explanatory diagram of the drive current waveform example of the stepping motor under the condition that increase of the moving load of the optical pickup 3 is previously detected between the position A and the position B and thereby a current value is increased to drive the optical pickup before and after the points including the point where the detected load is increased.
Figure 11:
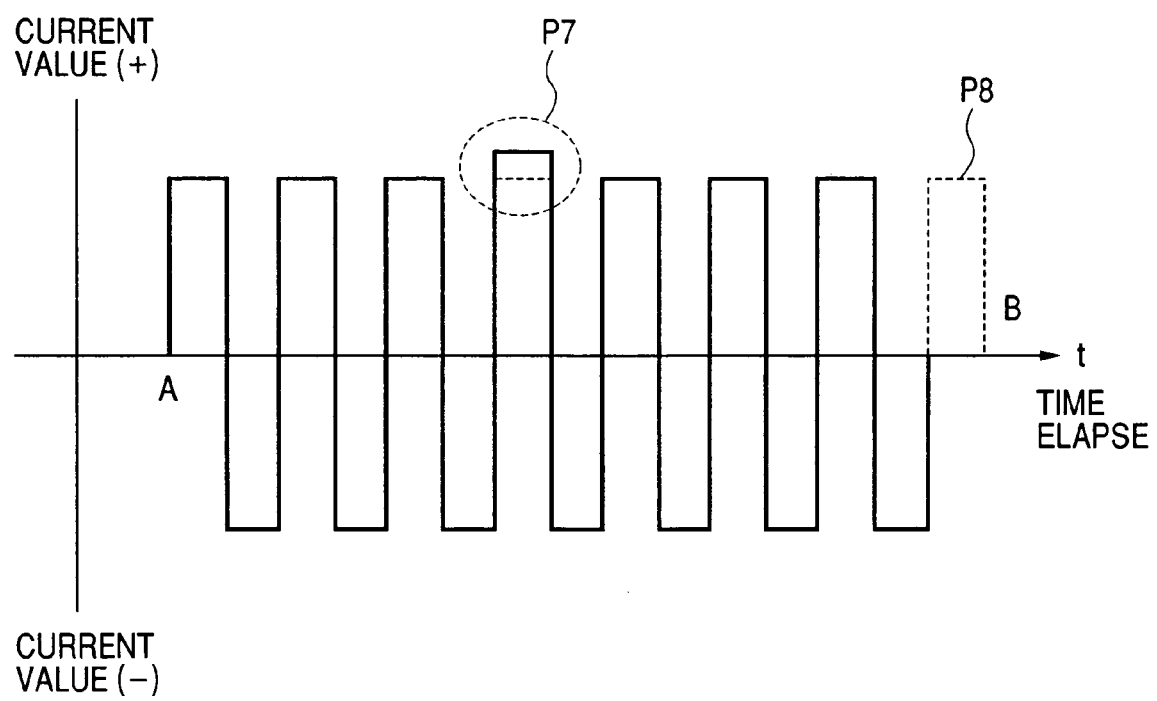
FIG. 11 is an explanatory diagram of the drive current waveform example of the stepping motor under the condition that when the moving load of the optical pickup 3 increases at a point between the position A and the position B and the total number of rotations of the stepping motor 5 is reduced from the predetermined value, the number of drive pulses is added to compensate for shortage in the number of rotations in order to set the total number of rotations to the predetermined value.
Figure 12:
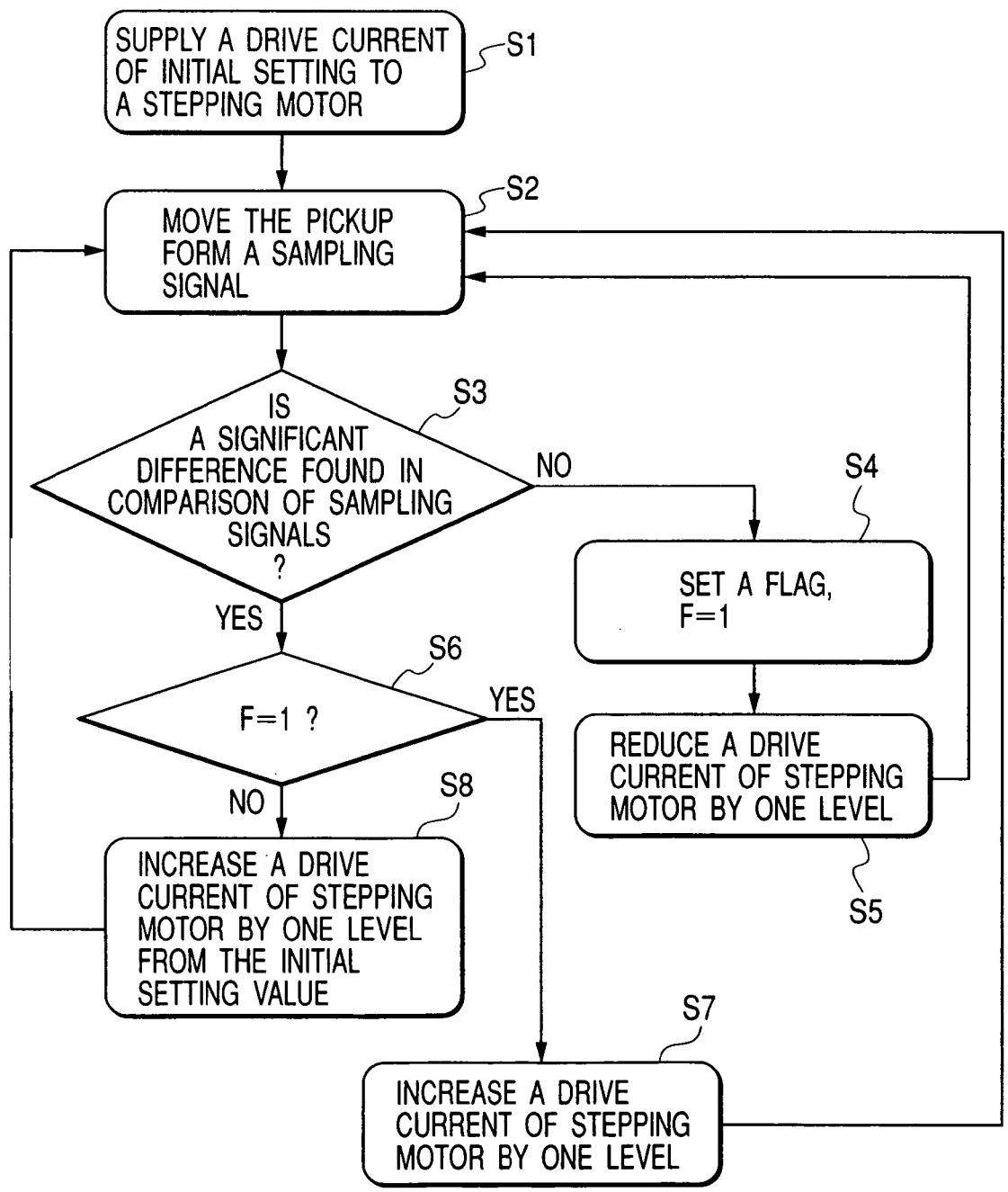
FIG. 12 is a flowchart of a first control example of the stepping motor.
Figure 13:
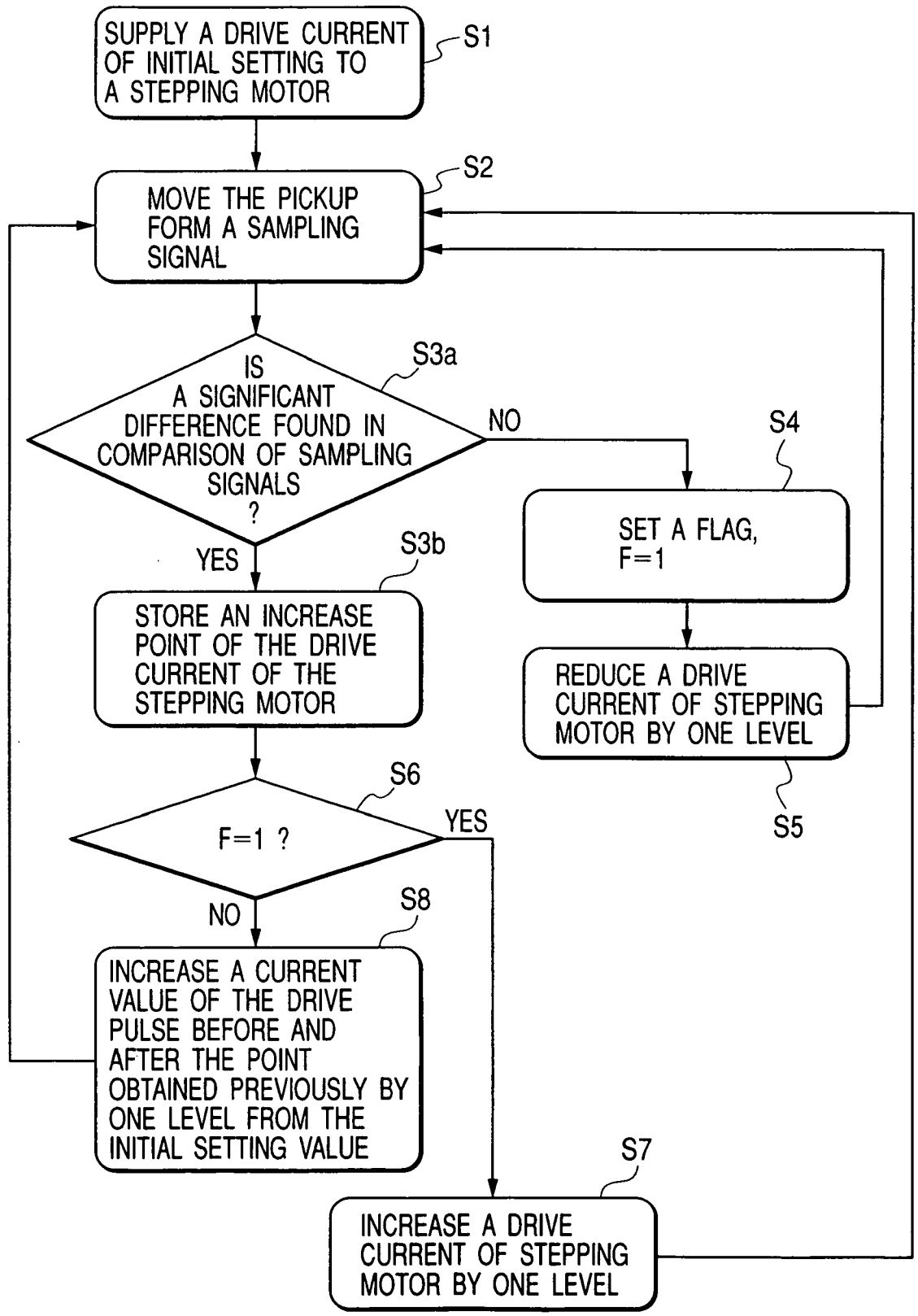
FIG. 13 is a flowchart of a second control example of the stepping motor.
Figure 14:
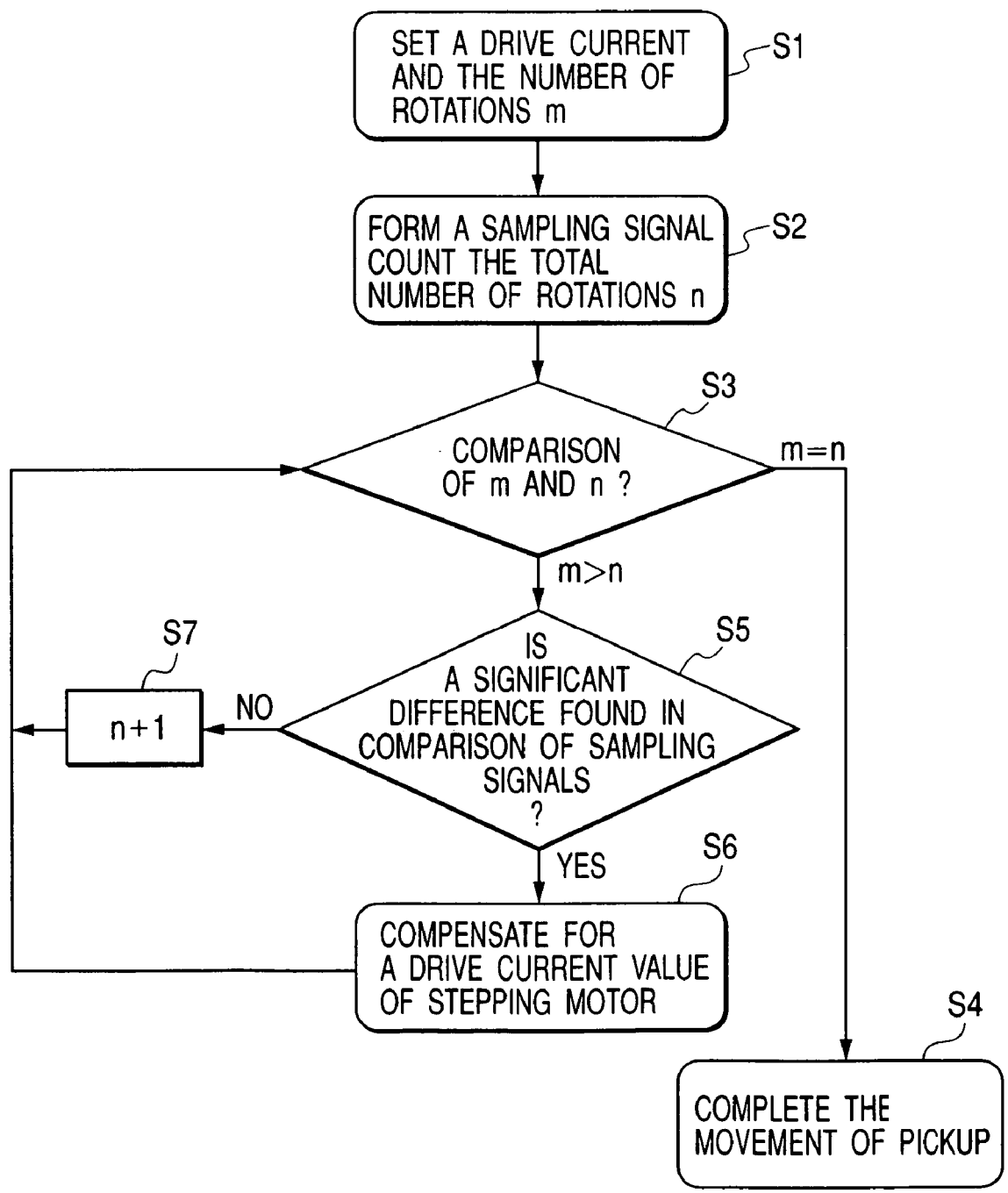
FIG. 14 is a flowchart of a third control example of the stepping motor.

FIG. 1 to FIG. 12 are explanatory diagrams of the preferred embodiments of the present invention. FIG. 1 is a construction example diagram of an optical disk drive as an embodiment of the present invention. FIG. 2 is a construction example diagram of a control system of a stepping motor. FIG. 3 is a construction example diagram of an optical pickup feed mechanism of the optical disk drive of FIG. 1. FIG. 4 is an explanatory diagram of the operation principle of the stepping motor used for movement of an optical pickup. FIG. 5 is a characteristic example diagram of the stepping motor. FIG. 6 to FIG. 11 are explanatory diagrams of a drive current waveform of the stepping motor. FIG. 12 is a flowchart showing a first control example of the stepping motor. FIG. 13 is a flowchart showing a second control example of the stepping motor. FIG. 14 is a flowchart showing a third control example of the stepping motor.

In FIG. 1, the reference numeral 1 designates an optical disk as a storage medium of information signal; 2, a disk motor for rotating the optical disk; 3, an optical pickup for conducting any one or both operations of the recording and reproducing operations of an information signal to and from the optical disk; 5, a stepping motor for moving the optical pickup 3 in the radius direction of the optical disk 1 for making access; 6, a stepping motor drive circuit for driving the stepping motor 5 by supplying a drive input to the stepping motor 5; 7, a stepping motor control circuit for controlling the stepping motor drive circuit 6; 8, a sampling signal forming/processing section to form a control signal to control a drive input (output of the stepping motor drive circuit 6) of the stepping motor 5 by forming a sampling signal based on an output of the stepping motor drive circuit 6 and by processing the sampling signal; 9, a system controller including the sampling signal forming/processing section 8 to control the entire part of the disk drive; 10, a screw which is provided with the threaded portion (screw) at the surface thereof and is rotated with the stepping motor 5 as the feed mechanism to move the optical pickup 3 through the rotation thereof in the radius direction of the optical disk 1 for making access; 11, a disk motor drive circuit for driving the disk motor 2; 12, a disk motor control circuit for controlling the disk motor drive circuit 11; 13, an actuator control drive circuit for controlling an actuator (not illustrated) used for the tracking control and focus control of the optical pickup 3; 14, a recording/reproducing signal processing circuit for processing a signal (recording signal) recorded to an optical disk 1 with the optical pickup and a signal (reproducing signal) reproduced from the optical disk 1 with the optical pickup 3; 17, an input terminal of the recording signal before the process; and 18, an output terminal of the reproducing signal after the process.

The actuator changes position and attitude of an objective lens within the optical pickup 3 during the tracking control and focus control. The optical disk drive of this construction executes, for example, the signal recording operation as explained below. That is, the recording signal inputted from the terminal 17 is subjected to the signal processes such as amplification and compression in the recording/reproducing signal processor 14 under the condition that the optical disk 1 is rotated in the predetermined number of rotations with the disk motor 2. Thereafter, the recording signal is then inputted to the optical pickup 3 and is converted to an optical signal of the laser beam in the optical pickup 3 with a light emitting diode and is then emitted from the objective lens (not illustrated). The emitted laser beam irradiates the information recording surface of the disk 1 and is then recorded thereto as the data along the predetermined tracks. In this case, the optical pickup 3 is moved at the predetermined velocity almost in the radius direction of the optical disk 1 with the feed mechanism driven with the stepping motor 5. The stepping motor 5 is driven to rotate in the predetermined torque and rotating velocity with the stepping motor drive circuit 6 to satisfy the feed specifications such as predetermined position and distance or the like of the optical pickup 3 under the condition being controlled based on the control signal outputted from the sampling signal forming/processing section 8 provided in the system controller 9. In this case, the optical pickup 3 is driven with the actuator control drive circuit under the focus control so that the objective lens is set to the predetermined location in the predetermined attitude for the information recording surface of the optical disk and also under the tracking control so that the objective lens is not deviated from the recording track. Moreover, the reproducing operation is conducted, for example, as explained below. Namely, under the condition that the optical disk 1 is rotated at the predetermined number of rotations with the disk motor 2, the laser beam emitted from the optical pickup 3 irradiates the information recording surface of the optical disk 1 via the objective lens and the reflected laser beam corresponding to the recording information is then incident to a light receiving section of the optical pickup 3. This optical signal is converted to an electrical (reproducing) signal in the light receiving section and this electrical signal is inputted to the recording/reproducing signal processing circuit 14. In this recording/reproducing signal processing circuit 14, the reproducing signal is subjected to the amplifying process and demodulating process and is then outputted from the terminal 18. In this case, the optical pickup 3 is also moved, as in the case of the recording operation explained above, in the predetermined velocity almost in the radius direction of the disk 1 with the feed mechanism which is driven with the stepping motor 5. The stepping motor 5 is driven to rotate in the predetermined torque and rotating velocity with an output of the stepping motor drive circuit 6 which is controlled based on the control signal outputted from the sampling signal forming/processing section 8 in the system controller 9. In this timing, the optical pickup 3 is driven, as in the case of the recording operation explained above, with the actuator control drive circuit under the focus control so that the objective lens is set in the predetermined location and attitude for the information recording surface of the optical disk and also under the tracking control so that the objective lens is not deviated from the recording track.

FIG. 2 shows a construction example of the control system of the stepping motor 5.

In FIG. 2, the reference numeral 5 designates a stepping motor; 6, a stepping motor drive circuit; 7, a stepping motor control circuit 8; 8, a sampling signal forming/processing section in the system controller 9; 20, a detection resistor for detecting an output current of the stepping motor drive circuit 6, namely a drive current of the stepping motor 5; 21, an amplifying circuit for amplifying a signal detected with the detection resistor 20; 22, a sampling circuit to form a sampling signal corresponding to the drive current of the stepping motor 5 based on the amplified detection signal; 23, a memory for storing the sampling signal and 24, a comparison circuit for comparing the level of the first sampling signal which is once stored to the memory 23 and is then read out with the level of the second sampling signal outputted on the real-time basis from the sampling circuit 22 and then forming and outputting a control signal based on the result of comparison. This sampling circuit 22 forms a digital sampling signal based on the amplified detection signal. Namely, the amplified input detection signal is sampled in the frequency of an integer times of the stepping pulse frequency, for example, in the ten and several times to several tens times the same frequency, the sampling result is averaged in unit of the stepping pulse, the average value is digitalized through the A/D conversion with an AD converter or the like and thereby the digital sampling signal is formed in unit of the stepping pulse. The digitalized sampling signal is stored in the memory 23 and the digitalized first sampling signal read from the memory 12 is compared with the digitalized second sampling signal outputted on the real-time basis from the sampling circuit 22 in the comparison circuit 24. Comparison of the first and second sampling signals is conducted in unit of the stepping pulse and between the adjacent stepping pulses. The control signal which is formed and is then outputted based on the result of comparison is then inputted to the stepping motor control circuit 7. The control signal is formed for every comparison, namely in unit of the stepping pulse when a difference between the sampling signals is judged higher than the predetermined value as a result of comparison of the sampling signals. The stepping motor control circuit 7 controls the stepping motor drive circuit 6 with the control signal outputted from the comparison circuit 24 and the optical pickup achieves the predetermined movement with which the stepping motor 5 can generate a torque which varies depending on the moving load of the optical pickup 3. When the level of the second sampling signal, for example, is judged higher than that of the first sampling signal which is a preceding signal on the time axis as a result of comparison by the comparison circuit 24, the stepping pulse value is set higher than the second stepping pulse value corresponding to increase of the moving load of the optical pickup 3 to increase a motor torque and thereby the predetermined movement of the optical pickup 3 can be assured considering the assumption that since the moving load such as slide resistance during movement of the optical pickup 3 is increased, the second stepping pulse value of the stepping motor 5 has become higher than the first stepping pulse value. Here, an input of the stepping motor 5 may be detected with the drive current or with the drive voltage as explained above. Moreover, detection may be realized with a means other than the detection resistor 20. In addition, the input control of the stepping motor 5 corresponding to the moving load when the optical pickup 3 is moved includes the control for increasing or reducing the number of stepping pulses, in addition to the control to increase or decrease the level of the stepping pulse as explained above. In this case, any one of the control for the stepping pulse value and the control for the number of stepping pulses may be used and both of these controls may be employed.

FIG. 3 shows a construction example of the optical pickup feed mechanism of the optical disk drive of FIG. 1.

In FIG. 3, the reference numeral 2 designates a disk motor; 3, an optical pickup; 4, a rack holder; 5, a stepping motor; 10, a screw; 16, a pressurizing spring and 40, a shaft. The rack holder 4 is integrated with the optical pickup 3 in the construction that an internal rack (not illustrated) is engaged with a lead screw of the screw 10. With rotation of the screw 10, the rack holder 4 is moved, together with the optical pickup 3, in the axial direction of the screw 10, namely almost in the radius direction of the optical disk. An engaging portion which is formed when the rack in the rack holder 4 engages with the screw 10 is energized with the pressurizing spring 16 and thereby disengagement between the screw 10 and rack (gear skip) is never generated even when the rack holder 4 or internal rack is given sudden impact and when the disk drive is suddenly accelerated. In this construction example, when a gap between the rack holder 4 and screw 10 becomes small, an energizing force of the pressurizing spring 16 increases but when the gap becomes small on the contrary, such energizing force decreases. A slide resistance generated when the optical pickup 3 is moved changes mainly depending on the contact condition for the lead portion of screw 10 in the engagement portion of the rack holder 4 and the contact condition is influenced by the energizing force of the pressurizing spring 16. Moreover, this contact condition also changes depending on the peripheral environment such as temperature wherein the optical disk drive is used and on entry of foreign matters such as dust and friction powder into the engagement portion. The slide resistance tends to become large under the condition that temperature is low and a foreign matter exists. On the contrary, when the peripheral temperature rises under the condition that any foreign matter does not exist, the slide resistance tends to be reduced. Such increase or decrease of slide resistance means increase or decrease of the load observed from the side of stepping motor. In the present invention, an input of the stepping motor 5 is increased or decreased corresponding to the increase or decrease of the moving load of the optical pickup 3 and thereby the optical pickup 3 can be moved with a torque having less margin against the load and moreover power consumption of the motor and drive circuit can be reduced. Contents of the input control of the stepping motor 5 include level compensation of stepping pulse and compensation for number of stepping pulses and therefore any one of control or control of both compensations is performed.

FIG. 4 is an explanatory diagram of the operation principle of the stepping motor 5 explained above.

In FIG. 4, L1 to L4 designate a stator coil; M1 to M4, a stator core and 50, a magnet rotor. When a current flows into the stator coil L1, the stator core M1 is energized to generate the pole S at the end part of the stator core M1 and this pole S attracts with each other the pole N of the magnet rotor 50. Thereby, the magnet rotor 50 rotates for almost 90 degrees in the clockwise direction from the position illustrated. Next, when a current flows into the stator coil L2, the stator core M2 is energized to generate the pole S at the end part of the stator core M and this pole S attracts with each other the pole N of the magnet rotor 50. Thereby, the magnet rotor 50 further rotates for almost 90 degrees in the clockwise direction. Next, when a current flows into the stator coil L3, the stator core M3 is energized to generate the pole S at the end part of the stator core M3 and this pole S attracts with each other the pole N of the magnet rotor 50. Thereby, the magnet rotor 50 further rotates for almost 90 degrees in the clockwise direction. Subsequently, when a current flows into the stator coil L4, the stator core M4 generates the pole S at the end part of the stator core M4 and this pole S attracts with each other the pole N of the magnet rotor 50. Thereby, the magnet rotor 50 further rotates for almost 90 degrees in the clockwise direction. Namely, when a current flows sequentially into the stator coils L1 to L4 as explained above, the magnet rotor 50 makes a rotation. When a current flows repeatedly into the stator coils L1 to L4, the magnet rotor 50 rotates depending on the current.

FIG. 5 shows a characteristic example of the stepping motor 5, indicating a relationship between a coil current value applied to the stator coil and a torque generated with such current. The stator cores M1 to M4 are more extensively energized by increasing a feed current to the stator coils L1 to L4 of the stepping motor 5 and more extensive pole S is respectively generated at the end part of the stator cores M1 to M4. Therefore, the magnet rotor 50 generates more extensive torque and moves the optical pickup 3 overcoming the moving load of the optical pickup 3. In FIG. 5, when a coil current value fed to the stator coil is defined as I(a), a torque equal to the load value F(a) can be generated. Therefore, when the moving load value of the optical pickup 3 is F(a), the moving operation of the optical pickup 3 can be realized by setting the coil current value to I(a) or higher. When the coil current value fed to the stator coil is assumed as I(b), a torque identical to the load value F(b) can be generated. Therefore, when the moving load value of the optical pickup 3 is F(b), the moving operation of the optical pickup 3 can be realized by setting the coil current value to I(b) or higher. When the coil current value fed to the stator coil is assumed as I(c), a torque identical to the load value F(c) can be generated. Thereby, when the moving load value of the optical pickup 3 is F(c), the moving operation of the optical pickup 3 can be realized by setting the coil current value to I(c) or higher. Moreover, for example, when the moving load value of the optical pickup 3 increases to F(c) from F(b) due to the increase of the slide resistance at the engagement portion of the rack holder 4 of the optical pickup 3 resulting from lowering of the environment temperature, the moving operation of the optical pickup 3 can be realized by setting the coil current value to I(c) or higher. The slide resistance also increases due to the friction at the engagement portion of the rack holder 4. Moreover, on the contrary, for example, when the moving load value of the optical pickup 3 reduces to F(a) from F(b) due to the decrease of the moving load value of the optical pickup 3 resulting from reduction of the slide resistance at the engagement portion of the rack holder 4 of the optical pickup 3 because of the environment temperature rise, the moving operation of the optical pickup 3 can be realized by setting the coil current value to I(a) or higher.

The drive input waveform of the stepping motor 5 will be explained below.

Figure 6:
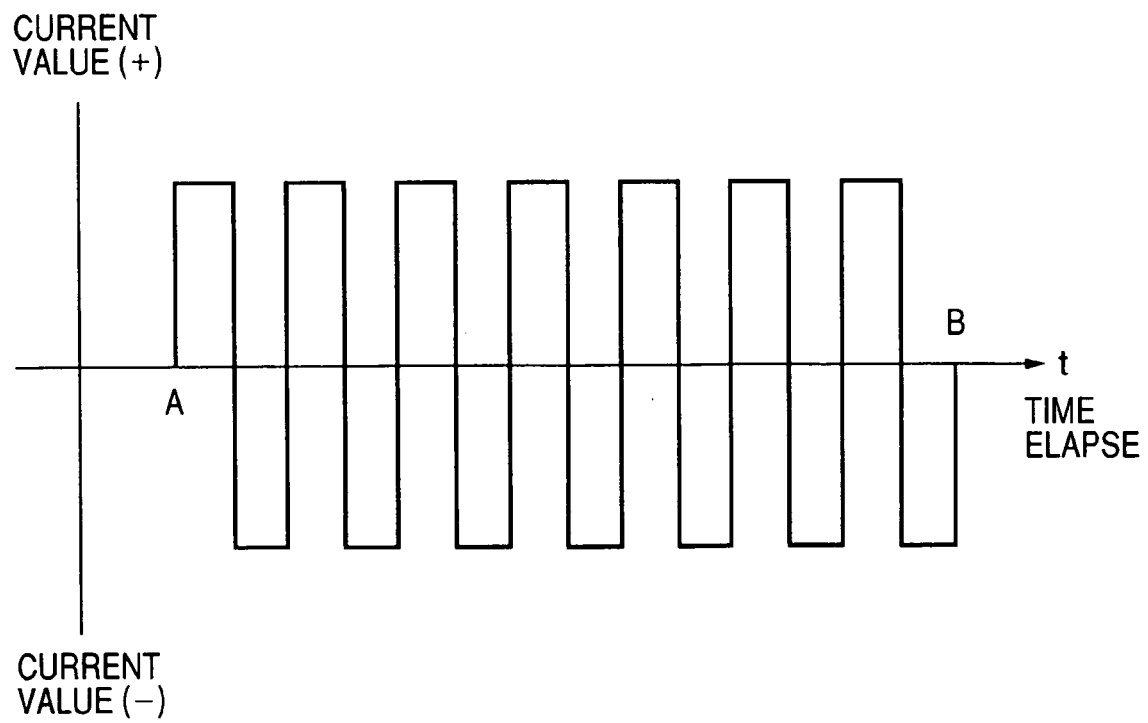
FIG. 6 is an explanatory diagram of a drive current waveform example of the stepping motor corresponding to the case where the optical pickup is smoothly moved with the stepping motor to the position B from the position A.
Figure 7:
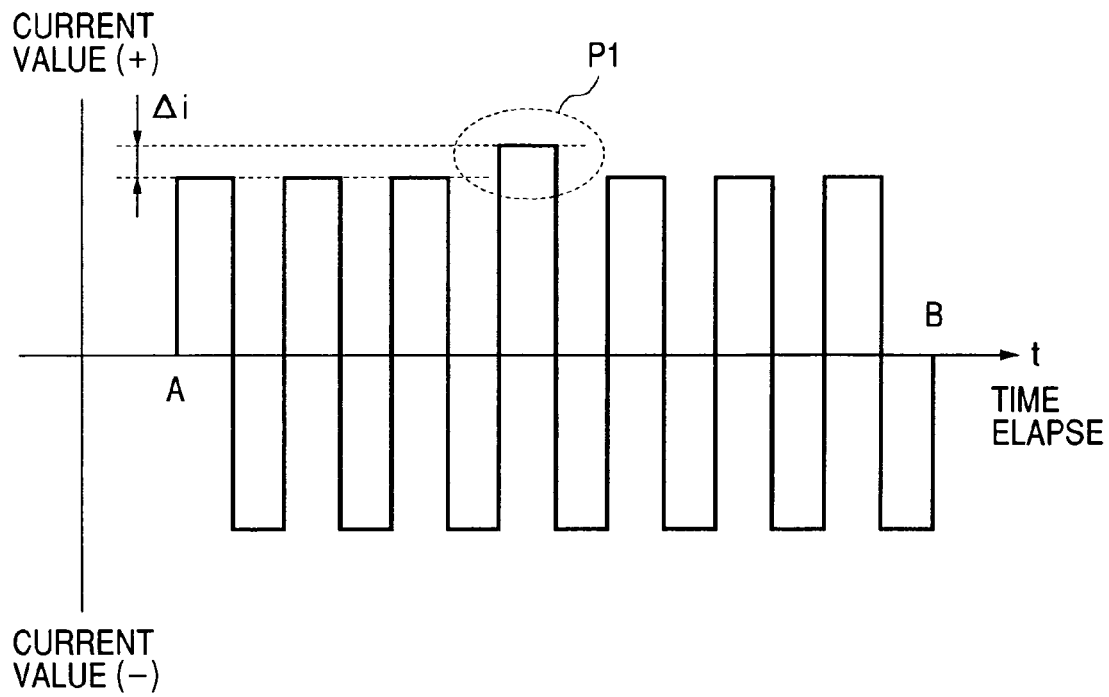
FIG. 7 is an explanatory diagram of a drive current waveform example of the stepping motor under the condition that a moving load of the optical pickup increases at a point between the position A and the position B.
Figure 8:
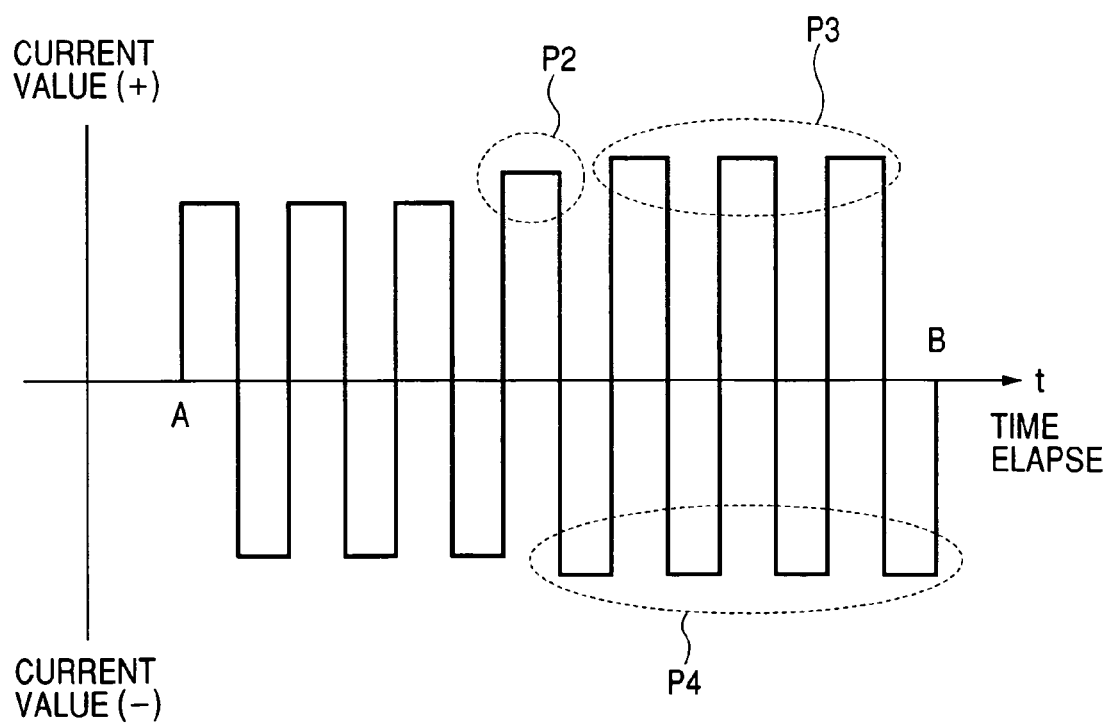
FIG. 8 is an explanatory diagram of the drive current waveform example of the stepping motor under the condition that the moving load of the optical pickup increases at a point between the position A and the position B and a current value is increased after the point where increase of the moving load is detected.
Figure 9:
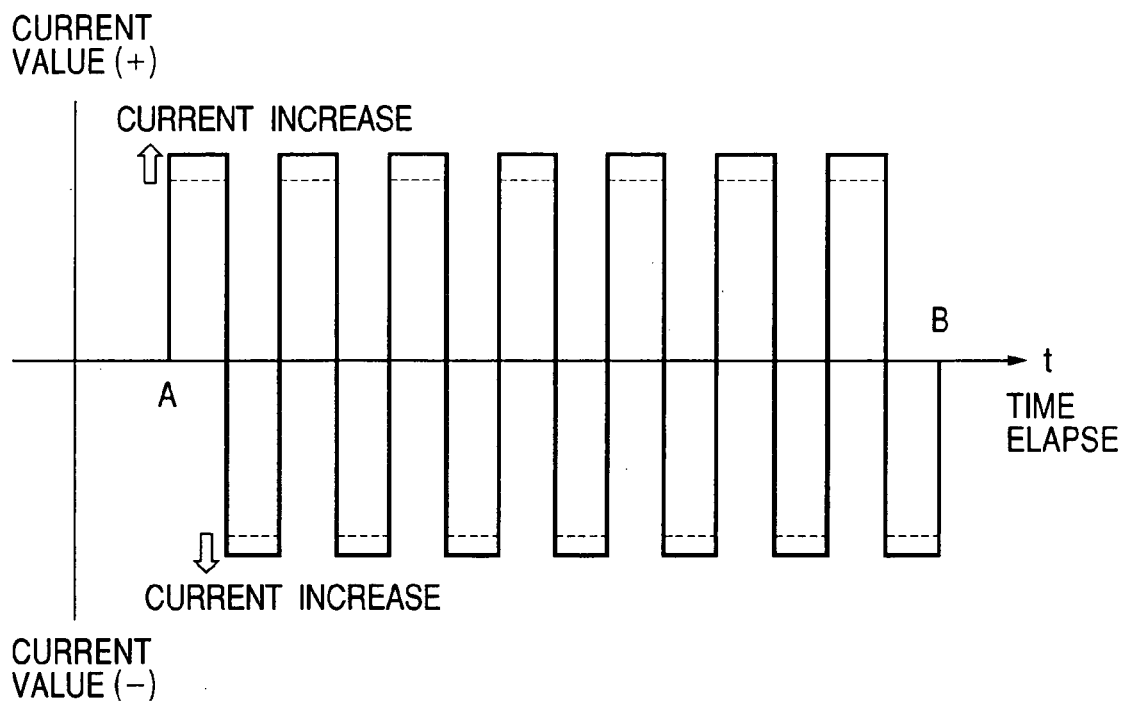
FIG. 9 is an explanatory diagram of the drive current waveform example of the stepping motor under the condition that increase of the moving load of the optical pickup 3 is detected at a point between the position A and the position B and amount of such increase is also detected previously and thereby a current value up to the position B from the position A is increased for all drive pulses in order to drive the optical pickup.

FIG. 6 to FIG. 11 are explanatory diagrams of the drive current (stepping pulse) waveforms of the stepping motor 5. FIG. 6 shows the drive current waveform in the case where the stepping motor 5 smoothly moves the optical pickup 3 to the position B from the position A. FIG. 7 is an explanatory diagram showing a changing condition of the drive current waveform in the case where the moving load of the optical pickup 3 increases at a point between the position A and the position B. FIG. 8 shows a drive current waveform under the condition that the moving load of the optical pickup 3 increases at a point between the position A and the position B and a current value is increased after the point where increase of the moving load is detected. FIG. 9 shows a drive current waveform under the condition that increase of moving load of the optical pickup 3 between the position A and the position B and amount of such increase are previously detected and thereby the current values up to the position B from the position A are increased for all drive pulses to move the optical pickup. FIG. 10 shows, as in the case of FIG. 9, the drive current waveform under the condition that increase of the moving load of the optical pickup 3 is previously detected between the position A and the position B and thereby the current values of the points before and after the points including the point where increase of the moving load is detected are increased to drive the optical pickup. FIG. 11 shows the drive current waveform under the condition that the number of drive pulses is added and shortage in the number of rotations is compensated to set the total number of rotations to the predetermined value when the moving load of the optical pickup 3 increases at a point between the position A and the position B and thereby the total number of rotations of the stepping motor 5 is reduced from the predetermined value.

In FIG. 6, A indicates the point from which the optical pickup 3 starts movement and B, the point where the optical pickup 3 completes the movement. For example, when the moving load of the optical pickup 3 does not show increase or decrease exceeding the predetermined value, a drive current of the stepping motor 5 almost does not change and change of the drive current is not detected with a detection resistor 20 of FIG. 2. Therefore, a sampling pulse formed in unit of drive pulse (stepping pulse) by a sampling circuit 22 within the sampling signal forming/processing section 8 of FIG. 2 almost does not change between the drive pulses (stepping pulses), a comparison circuit 24 does not output a control signal to change the drive pulse (stepping pulse), the stepping motor 5 is driven with the drive pulse (stepping pulse) having almost constant current value as shown in the figure and the optical pickup 3 is driven to the position B from the position A with a driving force of the stepping motor 5. This drive current waveform is the waveform of the stepping pulse which is fed to the stator coils L1, L3 of the stepping motor 5 of FIG. 4. A current of which phase is deviated by 90 degrees from such stepping pulse is fed to the stator coils L2, L4.

In FIG. 7, P1 indicates a drive pulse (stepping pulse) in which the peak value is increased, namely the pulse level is increased due to the increase of the moving load of the optical pickup 3 between the position A and the position B. Here, the peak value is higher than the other drive pulses as much as Δi. In this case, a detection signal corresponding to the changed drive current is generated by the detection resistor 20 of FIG. 2 and this drive current is then inputted to the sampling signal forming/processing section 8 of FIG. 2. In the sampling signal forming/processing section 8, the amplifying circuit 21 amplifies the detection signal, the sampling circuit 22 executes the sampling process, average calculation process and digitalizing process in unit of the drive pulse (stepping pulse) to form the sampling signal and moreover the comparison circuit 24 compares the signal with the sampling signal of the preceding drive pulse (stepping pulse) read from the memory 23 and outputs, as a result of comparison, the control signal to increase the peak value of the drive pulse at least after the drive pulse (stepping pulse) PI. The stepping motor control circuit 7 controls the stepping motor drive circuit 6 with the control signal and supplies the drive pulse of which peak value is increased depending on the moving load to the stepping motor 5 after the drive pulse (stepping pulse) PI. The drive current waveform of FIG. 6 corresponds to the waveform before execution of the control and the controlled drive pulse waveform after the drive pulse (stepping pulse) PI is not illustrated.

FIG. 8 shows the drive current waveform when a current value is increased after the point where increase of the load is detected.

In FIG. 8, P2 indicates a drive pulse (stepping pulse) of which peak value has increased due to the increase of the moving load of the optical pickup 3 between the position A and the position B. P2 and P3 indicate all drive pulses after the drive pulse (stepping pulse) P2 which are controlled to increase the peak values with the control system of FIG. 2. In the control system of FIG. 2, the detection resistor 20 generates a detection signal corresponding to the drive pulse of which peak value has increased and this detection signal is inputted to the sampling signal forming/processing section 8. In this sampling signal forming/processing section 8, the amplifying circuit 21 amplifies the detection signal, the sampling circuit 22 executes the sampling process, average value calculation process and digitalizing process in unit of the drive pulse (stepping pulse) to form the sampling signal, the comparison circuit 24 compares this sampling signal with the sampling signal of the preceding drive pulse (stepping pulse) read from the memory 23 (preceding drive pulse adjacent to the drive pulse P2) and also outputs, as a result of comparison, the control signal of which peak value of the drive pulse has increased at least after the drive pulse (stepping pulse) P2. The stepping motor control circuit 7 is controlled with the control signal and the stepping motor drive circuit 6 supplies the drive pulses P3 and P4 of which peak values have increased depending on the moving load to the stepping motor 5 after the drive pulse (stepping pulse) P2. The peak values of the drive pulses P3 and P4 can be increased, for example, through the process that the stepping motor control circuit steps up the drive voltage by single step or a plurality of steps. Even when the point in which the moving load of the optical pickup 3 increases is previously detected between the position A and the position B, the similar control explained above can also be conducted.

FIG. 9 shows the drive current waveform of the stepping motor 5 under the condition that the peak values of all drive pulses up to the position B from the position A are increased when the position in which the moving load of the optical pickup 3 is increased and the amount of such increase are previously detected between the position A and the position B. In this case, for example, when it is requested to move the optical pickup 3 to the position B from the position A for several times, the information in regard to the position in which the moving load of the optical pickup 3 and the amount of increase detected in the first movement is then used for the second movement in order to increase the peak values of all drive pulses up to the position B from the position A. Detection of the drive current, formation of the sampling signal, comparison of signals and formation of the control signal can be conducted in the same manner as that of FIG. 8.

FIG. 10 shows, as in the case of FIG. 9, the drive current waveform of the stepping motor 5 under the condition that the peak values of the drive pulses are increased before and after the drive pulses including the pulse of which detected load is increased, when increase of the moving load of the optical pickup 3 is detected previously between the position A and the position B. When it is requested also to move the optical pickup 3 for several times to the position B from the position A similar to the case explained above, the information in regard to the position where the moving load of the optical pickup 3 in increased and the amount of increase detected for the first movement is also used for the second movement to increase the peak values of the drive pulses (P5, P6) before and after that including the drive pulses in the time corresponding to the increase of load. Detection of drive current, formation and comparison of sampling signals and formation of the control signal are conducted in the same manner as those of FIG. 8.

FIG. 11 shows the drive current waveform in the case where when rotation of the stepping motor 5 is interfered due to the increase of moving load of the optical pickup 3 and the total number of rotations is reduced from the predetermined value, the number of drive pulses are added to compensate for such shortage in the number of rotations up to the predetermined number of rotations of the stepping motor 5 and thereby the optical pickup 3 can be moved to the position B from the position A. In FIG. 11, P7 indicates the drive pulse in which the peak value is increased due to the increase of the moving load of the optical pickup 3, while P8, the drive pulse by means of the control system of FIG. 2 in order to obtain the total number of rotations of the stepping motor 5. On the occasion of conducting this control, the control system of FIG. 2 forms and outputs the signal to control the stepping motor control circuit 7 to add the drive pulse P8 as the control signal corresponding to the detection signal detected by the detection resistor 20 of the comparison circuit 24 in the sampling signal forming/processing section 8.

FIG. 12 is the flowchart showing a first control example of the stepping motor. This flowchart suggests an example of the control procedures to form, for example, in the control system of FIG. 2, the drive current waveform of the stepping motor shown in FIG. 8 or FIG. 9.

In FIG. 12;

(1) The sampling signal forming/processing section 8 instructs the preset (initially set) drive current and number of rotations to the stepping motor control circuit 7 and the stepping motor control circuit 7 controls the stepping motor drive circuit 6 to supply the initially set drive current to the stepping motor 5 (step S1);

(2) The stepping motor 5 is driven to rotate with the drive pulse (stepping pulse) having the previously set current value to start the movement of the optical pickup 3 and the signal corresponding to the drive pulse (stepping pulse) of the stepping motor 5 is detected with the detection resistor 20 and is then stored to the memory 23 through the sampling based on the detection signal, average calculation for the result of sampling, A/D conversion of the average value and formation of digitalized sampling signal (step S2);

(5) The sampling signal read from the memory 23 is compared with the sampling signal outputted from the sampling circuit 22 on the real-time basis (step S3);

(4) A flag "1" is set when it is judged as a result of comparison that there is no difference (significant difference) equal to or higher than predetermined value among both sampling signals (step S4);

(5) The peak value of the drive pulse (stepping pulse) of the stepping motor 5 is reduced by one level from the preset value (step S5). Drive of the stepping motor 5 is continued with the drive pulse of which peak value is reduced to continue the movement of the optical pickup 3, to form the sampling signal and compares the sampling signals. When it is judged as a result of comparison that there is no difference (significant difference) equal to or higher than the predetermined value among the sampling signals, the peak value of the drive pulse (stepping pulse) of the stepping motor 5 is further reduced by one level. With repetition of these processes, the peak value of the drive pulse (stepping pulse) which is required at least to obtain the movement of the optical pickup is searched and is then converged to the peak value obtained;

(6) When it is judged as a result of comparison in the step S3 that there is a difference (significant difference) equal to higher than the predetermined value among both sampling signals, the flag "1" is set in the step S4 and it is also judged in the step S5 whether the current value was reduced by one level or more from the initially set value (step S6);

(7) When it is judged that such reduction of the current value has been conducted as a result of judgment, the peak value of the drive pulse (stepping pulse) of the stepping motor 5 is increased by one level (step S7);

(8) When it is judged that such reduction is never conducted as a result of judgment, the peak value of the drive pulse (stepping pulse) of the stepping motor 5 is increased by one level from the initially set value (step S8). Drive of the stepping motor 5 is continued with the drive pulse of which peak value is increased to continue the movement of the optical pickup 3 and the sampling signals are formed and compared again. When it is judged as a result of comparison that there is a difference (significant difference) equal to or higher than the predetermined value among the sampling signals, the peak value of the drive pulse (stepping pulse) of the stepping motor 5 is further increased by one level. With repetition of these processes, the drive pulse (stepping pulse) required at least to obtain the movement of the optical pickup is searched and is then converged to the peak value obtained.

FIG. 13 is the flowchart showing a second control example of the stepping motor 5. This flowchart suggests an example of the control procedures to form, for example, in the control system of FIG. 2, the drive current waveform shown in FIG. 10.

In FIG. 13;

(1) The sampling signal forming/processing section 8 suggests the preset (initially set) drive current and the number of rotations to the stepping motor control circuit 7 and the stepping motor control circuit 7 instructs the stepping motor drive circuit 6 to supply the initially set drive current to the stepping motor 5 (step S1);

(2) The stepping motor 5 is driven to rotate with the drive pulse (stepping pulse) having the initially set current value (peak value) to start movement of the optical pickup 3 and a signal corresponding to the drive pulse (stepping pulse) of the stepping motor 5 is detected and is then stored in the memory 23 through the sampling based on the detection signal, calculation for obtaining the average value of the results of sampling, A/D conversion of the obtained average value and information of the digitalized sampling signal (step S2);

(3) The sampling signal read from the memory 23 is compared with the sampling signal outputted from the sampling circuit 22 on the real-time basis (step S3*a*);

(4) When it is judged as a result of comparison that there is no difference (significant difference) equal to or higher than the predetermined value among both sampling signals, the flat "1" is set (step S4);

(5) The peak value of the drive pulse (stepping pulse) of the stepping motor 5 is reduced by one level from the initially set value (step S5). The stepping motor 5 is continuously driven with the drive pulse having the reduced peak value for continuation of the movement of the optical pickup 3. Simultaneously, the sampling signals are formed (step S2) and compared with each other (step S3*a*). When it is judged as a result of comparison that there is no difference (significant difference) equal to or higher than the predetermined value among the sampling signals, the peak value of the drive pulse (stepping pulse) of the stepping motor 5 is further reduced by one level (reduced in two levels from the initially set value). With repetition of these processes, the peak value of the drive pulse (stepping pulse) required at least to obtain the movement of the optical pickup 3 is searched and the drive pulse (stepping pulse) of the stepping motor 5 is converged to the peak pulse obtained;

(6) When it is judged as a result of comparison in the step S3*a* that there is a difference (significant difference) equal to or higher than the predetermined value among both sampling signals, the drive pulse corresponding to the relevant sampling signal is considered as the drive pulse of the timing corresponding to increase of load and its position is stored (step S3*b*);

(7) The flag "1" is set in the step S4 and it is judged whether the current value was reduced by one level or more from the initially set value in the step S5 (step S6);

(8) When it is determined as a result of judgment that the current level was reduced, the peak value of the drive pulses (P5, P6 in FIG. 10) before and after the relevant drive pulses including the drive pulse stored in the step S3*b* is increased by one level (step S7);

(9) When it is determined as a result of judgment that the current value is never reduced, the peak values of the drive pulses (P5, P6 in FIG. 10) before and after the drive pulses including the drive pulse stored in the step S3*b* are increased by one level from the initially set value (step S8). The stepping motor 5 is continuously driven with the drive pulse having increased the peak value for continuation of movement of the optical pickup 3. Simultaneously, the sampling signals are formed and compared with each other. When a difference (significant difference) is detected, as a result of comparison, equal to or higher than the predetermined value among the sampling signals, the peak value of the drive pulses (P5, P6 in FIG. 10) before and after the drive pulses including the drive pulse stored in the step S3*b* is further increased by one level. With repetition of these processes, the peak value of the drive pulse (stepping pulse) required at least to attain the movement of the optical pickup is searched and is then converged to the peak value obtained.

FIG. 14 is a flowchart showing a third control example of the stepping motor 5. This flowchart suggests an example of the control procedures to form, for example, in the control system of FIG. 2, the drive current waveform shown in FIG. 11.

In FIG. 14;

(1) The sampling signal forming/processing section 8 suggests the preset (initially set) drive current and total number of rotations m to the stepping motor control circuit 7 and the stepping motor control circuit 7 instructs the stepping motor drive circuit 6 to supply the initially set drive current to the stepping motor 5 (step S1);

(2) The stepping motor 5 is driven to rotate with the drive pulse (stepping pulse) having the current value (peak value) of initial setting to start the movement of the optical pickup 3. Simultaneously, the signal corresponding to the drive pulse (stepping pulse) of the stepping motor 5 is detected with the detection resistor 20 and is then stored in the memory 23 through the sampling based on the detection signal, calculation to obtain the average value of the sampling results, A/C conversion of the average value obtained and formation of the digitalized sampling signal. Moreover, the total number of rotations of the stepping motor 5 is counted (step S2);

(3) The counted total number of rotations n of the stepping motor is compared with the number of rotations m of the initial setting (step S3);

(4) When the result m=n is obtained as a result of comparison of the total number of rotations, the movement of the optical pickup 3 is completed (step S4);

(5) When the result n<m is obtained as a result of comparison of the total number of rotations, the sampling signal read from the memory 23 is compared with the sampling signal outputted from the sampling circuit 23 on the real-time basis (step S5);

(6) When it is determined, as a result of comparison of the sampling signals in the step S5, that a difference (significant difference) equal to or higher than the predetermined value is found among the sampling signals, the peak value of the drive pulse next to the drive pulse at least corresponding to the sampling pulse is compensated (step S6) and one rotation is added to the total number of rotations of the stepping motor 5. Thereafter, the process returns to the step S3 (step S7);

(7) When it is determined, as a result of comparison of the sampling signals in the step S5, that there is no difference (significant difference) equal to or higher than the predetermined value among both sampling signals, one rotation is added to the total number of rotations of the stepping motor 5 and thereafter the process returns to the step S3.

The processes of the items (5), (6) and (7) are repeated until the result, m=n can be obtained.

According to each construction of the embodiment, the moving load of the optical pickup 3 can be realized under the condition that a necessary input margin of the stepping motor 5 is controlled to the minimum value. Therefore, the power consumption of the stepping motor 5 can be reduced with inclusion of the stepping motor drive circuit 7. With reduction of power consumption of the stepping motor 5, the power consumption of the pickup feed mechanism including the motor can also be lowered up to about ⅔ of the power consumption in the related art. Particularly, under the control in FIG. 10 and FIG. 13, the power consumption can further be lowered by introducing the construction covering the change of the moving load with change of the peak value of a part of the drive pulses. Moreover, since an input such as drive current to drive the stepping motor 5 is detected with a simplified construction such as the detection resistor and the detection process is realized within the system controller 9, increase of cost required for such detection and control can also be lowered. Therefore, the power consumption can further be realized with the construction to control increase of the apparatus manufacturing cost. Moreover, the required movement of the optical pickup can also be assured by covering variation of load during movement such as a slide resistance of optical pickup with change of drive torque in unit of the drive pulse and also covering change from time to time of the moving load of the optical pickup because of change of environmental condition of the optical disk drive with a drive current input and a drive torque corresponding to such change of load. Reduction of power consumption results in reduction in amount of heat generated from the drive circuit and also reduction of temperature rise in the disk drive.

In above embodiment, the drive current pulse (stepping pulse current) as an input to the stepping motor is controlled, but the present invention is not limited thereto and also allows use of a construction to control a drive voltage. Moreover, in the construction explained above, an input of the stepping motor is detected with a detection resistor, the present invention is also not restricted thereto and also allows use of the other detection means. Moreover, the sampling signal forming/processing section 8 may be provided at the external side of the system controller 9.

According to the present invention, in the optical disk drive, power consumption can be lowered with the construction to control increase of the manufacturing cost of disk drive and moreover change of load during movement such as a slide resistance of optical pickup can be covered with change of drive torque and thereby predetermined movement of the optical pickup can be attained.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disk drive for conducting any one or both of the information recording and reproducing operations to and from an optical disk through an optical pickup, comprising:
   a stepping motor for moving said optical pickup almost in the radius direction of said optical disk;
   a motor drive circuit for driving said stepping motor;
   a sampling circuit for forming sampling signals by sampling a drive current or a drive voltage of said stepping motor outputted from said motor drive circuit during movement of said optical pickup; and
   a control circuit for detecting change of said sampling signals by comparing the value of a sampling signal formed by sampling a first stepping pulse with the value of a sampling signal formed by sampling a second stepping pulse adjacent to the first stepping pulse and controlling said motor drive circuit based on a result of said detection;

wherein, when the difference between said two values of said sampling signals is more than a predetermined value, said control circuit controls said motor drive circuit and the movement of said optical pickup based on information of said sampling signals formed by the sampling of the first and second adjacent stepping pulses.

2. The optical disk drive according to claim 1, wherein said sampling circuit is constructed to form digitalized sampling signals.

3. The optical disk drive according to claim 1, wherein the control circuit is configured for controlling said motor drive circuit and the movement of said optical pickup based only on the information of said sampling signals formed by the sampling of the first and second adjacent stepping pulses, without using a signal output from the optical pickup.

4. An optical disk drive for conducting any one or both of the information recording and reproducing operations to and from an optical disk through an optical pickup, comprising:
  a stepping motor for driving a feed mechanism to move said optical pickup almost in the radius direction of said optical disk;
  a motor drive circuit for driving said stepping motor; and
  a control circuit for forming sampling signals in unit of stepping pulse by sampling stepping pulses outputted from said motor drive circuit during movement of said optical pickup and comparing the value of a sampling signal formed by sampling a first stepping pulse with the value of a sampling signal formed by sampling a second stepping pulse adjacent to the first stepping pulse and controlling said motor drive circuit based on a result of the comparison of said sampling signals;
  wherein,
  when the difference between said two values of said sampling signals is more than a predetermined value, said control circuit controls said motor drive circuit based on information of said sampling signals formed by the sampling of said first and second adjacent stepping pulses; and
  said stepping motor is controlled corresponding to a load of said feed mechanism and the movement of said optical pickup can be controlled by controlling said stepping motor.

5. The optical disk drive according to claim 4, wherein the said control circuit is configured for controlling said motor drive circuit based only on the information of said sampling signals formed by the sampling of said first and second adjacent stepping pulses, without using a signal output from the optical pickup.

6. An optical disk drive for conducting any one or both of the information recording and reproducing operations to and from an optical disk through an optical pickup, comprising:
  a stepping motor for driving a feed mechanism to move said optical pickup almost in the radius direction of said optical disk;
  a motor drive circuit for driving said stepping motor;
  a first control circuit for forming sampling signals in unit of stepping pulse by sampling stepping pulses outputted from said motor drive circuit during movement of said optical pickup, storing said sampling signals and comparing the value of a sampling signal formed by sampling a first stepping pulse with the value of a sampling signal formed by sampling a second sampling pulse adjacent to the first stepping pulse; and
  a second control circuit for controlling said stepping pulses by controlling said motor drive circuit based on the result of said comparison; wherein:
  said first and second control circuits control said motor drive circuit based on information of said sampling signals formed by the sampling of the first and second adjacent stepping pulses, when the difference between said two values of said sampling signals is more than a predetermined value; and
  said stepping motor is controlled corresponding to a load of said feed mechanism and the movement of said optical pickup can be controlled by controlling said stepping motor based on said controlling of said stepping pulses.

7. The optical disk drive according to claim 6, wherein said first control circuit is constructed to digitally store sampling signals.

8. The optical disk drive according to claim 6, wherein said first control circuit is constructed to compare said sampling signals with each other between the adjacent stepping pulses and detect change of said sampling signals.

9. The optical disk drive according to claim 6, wherein the control of the motor drive circuit by the first and second control circuits is based only on the information of said sampling signals formed by the sampling of said first and second adjacent stepping pulses, and does not use a signal output from the optical pickup.

10. An optical disk drive for conducting any one or both of the information recording and reproducing operations to and from an optical disk through an optical pickup, comprising:
  a stepping motor for driving a feed mechanism for moving said optical pickup almost in the radius direction of said optical disk;
  a motor drive circuit for driving said stepping motor;
  a sampling circuit for forming sampling signals in unit of stepping pulse by sampling stepping pulse outputted from said motor drive circuit during movement of said optical pickup and averaging the result of said sampling;
  a storage circuit of storage medium for storing said sampling signals;
  a first control circuit for comparing the value of a sampling signal formed by sampling a first stepping pulse with the value of a sampling signal formed by sampling a second stepping pulse adjacent to the first stepping pulse; and
  a second control circuit for controlling said motor drive circuit based on the result of said comparison; wherein:
  said first and second control circuits control said motor drive circuit based on information of said sampling signals formed by the sampling of the first and second adjacent stepping pulses, when the difference between said two values of said sampling signals is more than a predetermined value; and
  drive of said stepping motor is controlled corresponding to a load of said feed mechanism and the movement of said optical pickup can be controlled by controlling said stepping motor based on said controlling of said controlling of said motor drive circuit.

11. The optical disk drive according to claim 10, wherein the control of the motor drive circuit by the first and second control circuits is based only on the information of said sampling signals formed by the sampling of said first and second adjacent stepping pulses, and does not use a signal output from the optical pickup.

12. A method of controlling movement of an optical pickup of an optical disk drive for conducting any one or both of the information recording and reproducing operations to and from an optical disk, comprising the steps of:

sampling a drive pulse of a stepping motor during movement of said optical pickup almost in the radius direction of said optical disk by said stepping motor;

forming sampling signals in unit of said drive pulse;

comparing the value of a sampling signal formed by sampling a first drive pulse with the value of a sampling signal formed by sampling a second drive pulse adjacent to the first drive pulse;

detecting a drive pulse change based on the result of said comparison; and controlling said stepping motor based on information of said sampling signals obtained by the sampling of the first and second adjacent stepping pulses in response to the difference between said two values of said sampling signals being more than a predetermined value, wherein said stepping motor is controlled corresponding to a load of said optical pickup when it is moved in order to control the movement of said optical pickup and the movement of said optical pickup can be controlled by controlling said stepping motor.

13. The method according to claim 12, wherein the controlling step controls said stepping motor based only on the information of said sampling signals obtained by the sampling of the first and second adjacent stepping pulses, without using a signal output from the optical pickup.

14. A method of controlling movement of an optical pickup of an optical disk drive for conducting any one or both of the information recording and reproducing operations to and from an optical disk, comprising the steps of:

sampling drive pulses of a stepping motor during movement of said optical pickup almost in the radius direction of said optical disk by said stepping motor;

forming sampling signals in unit of said drive pulses;

storing said sampling signals and comparing the value of a sampling signal formed by sampling a first drive pulse with the value of a sampling signal formed by sampling a second drive pulse adjacent to the first drive pulse;

detecting change of said drive pulses based on the result of said comparison and controlling at least one of the drive pulses when the difference between said two values is more than a predetermined value; and controlling said stepping motor corresponding to a load of said optical pickup based on information of said sampling signals obtained by the sampling of the first and second adjacent stepping pulses when the optical pickup is moved in order to control the movement of said optical pickup and the movement of said optical pickup can be controlled by controlling said stepping motor.

15. The method according to claim 14, wherein the controlling step controls said stepping motor based only on the information of said sampling signals obtained by the sampling of the first and second adjacent stepping pulses, without using a signal output from the optical pickup.

* * * * *